Patented Nov. 30, 1948

2,455,254

UNITED STATES PATENT OFFICE 2,455,254

ANTIOXIDANTS

Charles I. Jarowski, Springfield, and Eric T. Stiller, Philadelphia, Pa., assignors to Wyeth Incorporated, Philadelphia, Pa., a corporation of Delaware No Drawing. Application August 22, 1946, Serial No. 692,368

6 Claims. (Cl. 260—398.5)

This invention relates to antioxidants and more particularly to the inhibition of oxidative changes by the use of a non-toxic antioxidant.

An object of the invention is to provide an antioxidant for animal and vegetable oils.

A further object is to provide a stabilizer for edible substances.

A still further object is to provide an antioxidant for edible substances containing oleaginous materials as well as medicinals and pharmaceuticals containing an oil or fat.

These objects are accomplished by incorporating in a material which normally tends to become rancid a small amount, sufficient to inhibit rancidity, of a polyphenol compound having two phenolic residues connected at unsubstituted positions by a chain of five carbon atoms, the central carbon (the 3-position) bonded to either oxygen in ketonic form or to an hydroxy group. More particularly the phenolic residues have an R—O— group in a position ortho to the phenolic hydroxyl group, where R may be either an alkyl, aryl or aralkyl. In addition, the 5 carbon chain may either be a completely saturated chain or may be a 1,4-diene.

While the broad class of compounds indicated hereinabove have been found, in general, to be effective, it has been found that divanillal acetone, divanillyl acetone, divanillal isopropanol and divanillyl isopropanol are especially effective and of these the most satisfactory are the acetones.

Among the compounds which may be used with effective results as antioxidants are the following:

1,5-bis (3-methoxy-4-hydroxyphenyl) 1,4-pentadiene-3-one
1,5-bis (3-ethoxy-4-hydroxyphenyl) 1,4-pentadiene-3-one
1,5-bis (3-phenoxy-4-hydroxyphenyl) 1,4-pentadiene-3-one
1,5-bis (3-benzyloxy-4-hydroxyphenyl) 1,4-pentadiene-3-one
1,5-bis (3-phenoxy-4-hydroxyphenyl) 1,4-pentadiene-3-ol
1,5-bis (3-benzyloxy-4-hydroxyphenyl) 1,4-pentadiene-3-ol
1,5-bis (3-phenoxy-4-hydroxyphenyl) 3-pentanone
1,5-bis (3-benzyloxy-4-hydroxyphenyl) 3-pentanone
1,5-bis (3-methoxy-4-hydroxyphenyl) 1,4-pentadiene-3-ol
1,5-bis (3-propoxy-4-hydroxyphenyl) 1,4-pentadiene-3-ol
1,5-bis (3-methoxy-4-hydroxyphenyl) 3-pentanone
1,5-bis (3-methoxy-4-hydroxyphenyl) 3-pentanol
1,5-bis (3-phenoxy-4-hydroxyphenyl) 3-pentanol
1,5-bis (3-benzyloxy-4-hydroxyphenyl) 3-pentanol The compounds containing the unsaturated chains are prepared in accordance with the general method disclosed by Glaser and Framer, Jour. Prakr. Chem. 116, 331 (1927). In order to prepare the compounds containing the completely saturated chains, the respective unsaturated compound is hydrogenated in ethanol solution (95%) using a hydrogen pressure of 30 pounds gage and $PtO_2$ as the catalyst.

The material which can be stabilized successfully by the new antioxidants are such edible substances as vegetables, cereals, grain and grain products, confections, meats, fish, sea food, poultry and compositions containing them. In addition dried tea, cocoa, chocolate and coffee and coffee products can also be stabilized. In the case of coffee and coffee products, such as instant and soluble coffees, the antioxidant may be added either before or after the coffee roasting, or before or after coffee grinding. The antioxidant is also effective for sauces, dried eggs, salad dressings, milk and milk products, such as dried milk, dried skimmed milk containing added fats, butter, cream and ice cream. Furthermore, the antioxidant retards development of rancidity in animal and vegetable fats and oils or products containing them, such as pastries and baked, cooked or dried edible materials. Protection against rancidity is afforded such substances as lard, beef tallow, butter, cocoa butter, peanut oil, cottonseed oil, coconut oil, palm oil, olive oil, corn oil, castor oil, soya bean oil, sesame oil and hydrogenated animal and vegetable oils generally used in or for foodstuffs. Marine oils, such as shark liver, halibut liver, cod liver and other marine oils or other oils or fats which are generally used in medicinal or pharmaceutical preparations are likewise protected against rancidity.

The concentration in which the antioxidant is used will vary with the degree of stabilization desired and with the kind of material to be stabilized. In general, the concentration may range from about 0.04% to about 0.2% by weight, based on the material to be stabilized.

Table I serves to illustrate the antioxygenic activity of the unsaturated series of compounds, specifically the divanillal compounds, and more specifically divanillalacetone in which the data is based on assays of the ability of the particular antioxidant to maintain the iodine number of a mixture of 2 grams of purified linoleic (iodine number over 160) acid and 10 grams of corn starch at a temperature of 37° C.

*Table I*

| Antioxidant | Amount | Iodine Number | | | |
|---|---|---|---|---|---|
| | | 1 Week | 2 Weeks | 3 Weeks | 4 Weeks |
| Blank | | 56 | 50 | | |
| Divanillal acetone | 5 mg. (0.04%) | 125 | 121 | 68 | 45 |
| Do | 10 mg. (0.08%) | 129 | 118 | 105 | 105 |
| Do | 20 mg. (0.17%) | 133 | 117 | 113 | 114 |
| Do | 25 mg. (0.21%) | 131 | | | |

From the table it will be noted the divanillal compound is effective in a concentration from about 0.04% to about 0.2%.

Table II illustrates the antioxygenic activity of the hydrogenated series of compounds, specifically the divanillyl compounds and more specifically divanillyl acetone. The data is based on assays carried out in the same manner as indicated for Table I.

*Table II*

| Antioxidant | Amount | Iodine Number | | | |
|---|---|---|---|---|---|
| | | 1 Week | 2 Weeks | 3 Weeks | 4 Weeks |
| Blank | | 72 | 70 | 42 | 43 |
| Divanillyl acetone | 1 mg. (0.008%) | 72 | 69 | 36 | 36 |
| Do | 5 mg. (0.04%) | 118 | 110 | 35 | 37 |
| Do | 10 mg. (0.08%) | 160 | 157 | 106 | 114 |
| Do | 20 mg. (0.17%) | 167 | 157 | 117 | 114 |
| Do | 25 mg. (0.21%) | 154 | 154 | 108 | 111 |

The above Table II also indicates that the effective concentration of the divanillyl compound ranges from about 0.04% to about 0.2%.

While the tables cover only two specific compounds, they represent both the saturated and the unsaturated series and any compounds falling within the general classes are also useful as antioxidants. It is not intended that the examples given be limitative but merely representative of the invention.

We claim:

1. A composition of matter comprising an oleaginous material normally subject to oxidative changes and a polyphenolic antioxidant containing a chain of five carbon atoms connecting two hydroxy phenyl radicals, said hydroxy phenyl radicals having an ether selected from the group consisting of alkyl, aryl and aralkyl ethers in a position ortho to the phenolic hydroxyl group, said chain having connected to the carbon in the 3-position a member selected from the group consisting of oxygen and hydroxy group.

2. A material normally subject to oxidative rancidity containing a proportion, effective as an antioxidant, of a polyphenolic compound containing a chain of five carbon atoms connecting two hydroxy phenyl radicals, said chain having connected to the carbon in the 3-position a member selected from the group consisting of an oxygen and a hydroxy radical and said hydroxy phenyl radicals having an ether selected from the group consisting of alkyl, aryl and aralkyl ethers in a position ortho to the phenolic hydroxyl group.

3. A process for retarding the development of rancidity in animal and vegetable fats and oils and compositions containing them, comprising incorporating therein, in a proportion effective to inhibit the development of rancidity, a polyphenolic compound containing a chain of five carbon atoms connecting two hydroxy phenyl radicals, said chain having connected to the carbon in the 3-position a member selected from the group consisting of an oxygen and a hydroxy radical and said hydroxy phenyl radicals having an ether selected from the group consisting of alkyl, aryl and aralkyl ethers in a position ortho to the phenolic hydroxy group.

4. A material normally subject to the effect of oxidative rancidity containing a proportion, effective as an antioxidant, of divanillal acetone.

5. Animal and vegetable fats and oils normally tending to become rancid containing a proportion, effective as an antioxidant, of divanillyl isopropanol.

6. As a new antioxidant for animal and vegetable fats and oils, divanillyl acetone.

CHARLES I. JAROWSKI.
ERIC T. STILLER.

REFERENCES CITED

The following references are of record in the file of this patent:

UNITED STATES PATENTS

| Number | Name | Date |
|---|---|---|
| 2,064,610 | Hunt | Dec. 15, 1936 |
| 2,104,084 | Latham | Jan. 4, 1938 |